350-96.1
XR 3,254,317
CROSS REFERENCE SEARCH ROOM

May 31, 1966 | P. A. BAUER | 3,254,317

SOLID DELAY LINE

Filed March 18, 1963 | 2 Sheets-Sheet 1

INVENTOR.
Paul A. Bauer

BY Walter S. Zebrowski
ATTORNEY

3254317
OR IN 333/30R

INVENTOR.
Paul A. Bauer
BY Walter S. Zebrowski
ATTORNEY 3,254,317
SOLID DELAY LINE
Paul A. Bauer, Bradford, Pa., assignor to Corning Glass Works, Corning, N.Y., a corporation of New York
Filed Mar. 18, 1963, Ser. No. 265,752
4 Claims. (Cl. 333—30)

This invention relates to a signal delay means and more particularly to a solid ultrasonic delay line and a method for attenuating spurious signals.

Delay lines are used as dynamic storage devices in electronic circuits. One application for ultrasonic delay lines is in the radar receiver art, for example, in moving target identification (MIT) devices. In such devices, the delay line is used to delay received echoes or pulses for comparison with succeeding echoes or pulses in order to determine whether any change has occurred in the timing of the signal. Another application is to provide for storage of energy pulses representing bits of information, such as binary digits or the like, in digital computors. By means of suitable electrical circuitry, such delay lines generally termed digital delay lines, are fed said bits of information in a predetermined desired order, which bits are thereafter stored by recirculating them in said delay line for any desired period of time, such as for example, until the particular bit or bits are required in the computing process, are removed, are replaced, or the like. Said bits of information generally represent binary digits and are fed to the delay line as pulses of direct current energy or are represented by the lack of such pulses. This is contrasted to the input signal to ultrasonic delay lines, such as those used in MIT devices, where said input signals consist of continuous high frequency or pulse radio frequency energy.

An electrical signal is supplied to an ultrasonic delay line by means of a transducer mounted on the input facet of said delay line. In addition to producing the main signal, said transducer also produces other unwanted signals, herein termed spurious signals. The utility of a solid ultrasonic delay line is greatly curtailed by the number and ampiltude of such spurious signals, and heretofore many attempts have been made to extend the utility of said delay line by rejecting or attenuating these spurious signals. The more important considerations in rejecting or attenuating spurious signals are the reduction of the amplitude of individual spurious signals relative to the main signal, and the reduction of the vector sum of these signals, herein termed "noise level." The noise level can be reduced by either reducing the number of spurious signals of an amplitude in excess of some desired amplitude as determined by a particular application, or reducing the amplitude of the largest spurious signals. It should be noted that the main signal is caused to propagate through a delay medium to strike the reflecting facet at a predetermined desired fixed angle, herein termed strike angle, while the spurious signals naturally propagate at angles other than said fixed angle.

It is an object of this invention to provide a solid ultrasonic delay line having a high rate of utility.

Another object of this invention is to provide a solid ultrasonic delay line having improved cancellation or rejection of selected individual spurious signals.

Still another object of this invention is to provide a solid ultrasonic delay line having improved main signal to noise level ratio.

According to this invention a solid ultrasonic delay line and method are provided whereby the main signal is caused to propagate through the delay medium so as to have a strike angle at the reflection facets of said delay line slightly greater than the critical angle of said delay medium, while some of the spurious signals are caused to strike the reflection facets at angles less than said critical angle causing such spurious signals to be converted to a different mode of vibration to which the output transducer of said delay line is substantially insensitive, thereby cancelling or attenuating said spurious signals.

Additional objects, features and advantages of the present invention will become apparent to those skilled in the art from the following detailed description and attached drawings on which, by way of example, only the preferred embodiments of this invention are illustrated.

Figure 1:
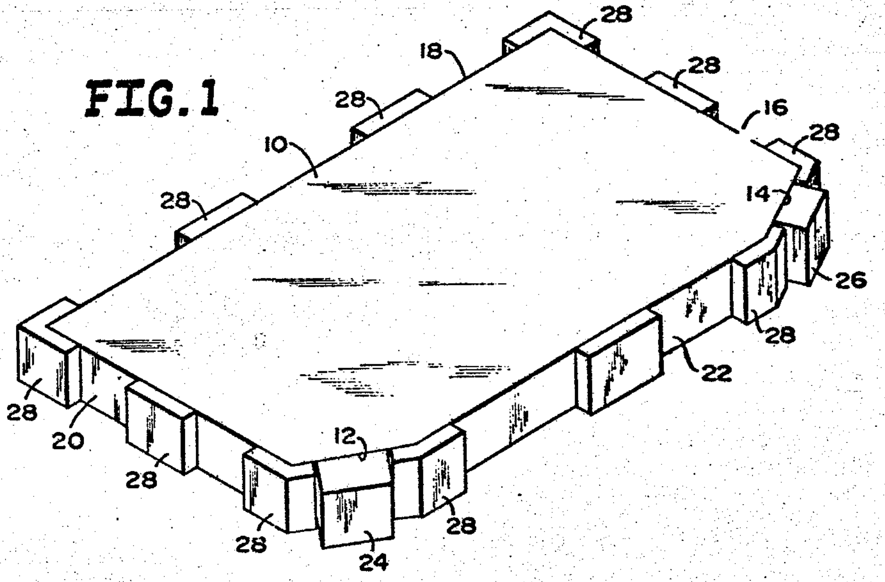
FIGURE 1 is an oblique view of a solid ultrasonic delay line.

FIGURE 1 illustrates a solid ultrasonic delay line assembly wherein delay medium 10 has input facet 12, output facet 14, and reflection facets 16, 18, 20 and 22 formed thereon. Input transducer 24 is shown mounted on input facet 12, and output transducer 26 is shown mounted on output facet 14. Acoustic absorbers 28 are mounted about the periphery of said delay line medium at predetermined positions as hereinafter described to absorb certain spurious signals.

Suitable delay line medium materials are fused silica, alkali-lead-silicate glass such as described in co-pending patent application by H. L. Hoover and M. E. Nordberg, S.N. 118,185, filed June 19, 1961, and the like.

Although the specific peripheral configuration of the digital ultrasonic delay line medium in accordance with this invention is not critical, except as hereinafter noted in connection with the forming of input, output, and signal reflection facets, the medium must be of a flat type. The blank for such a delay medium may be either molded in a desired shape or cut from a large shaped blank in accordance with conventional delay medium forming procedures, and may then be annealed in accordance with conventional delay medium annealing practices. The blank is then ground and polished as desired.

Transducers 24 and 26 may be composed of a crystalline piezoelectric material, such as crystalline quartz, barium titanate, mixtures of lead zirconate and lead titanate, potassium sodium niobate, and the like. They are sealed to facets 12 and 14 respectively on delay medium 10. Acoustic absorber 28 may be composed of any acoustic absorbing material such as lead, tin, and the like, and the composition is not critical as long as the material can be bonded to the delay medium and has a high signal attenuation. A particularly suitable absorber material is an indium rich alloy comprising about 60 percent indium and about 40 percent tin.

In a solid ultrasonic delay line, an elastic wave, vibrating in the thickness-shear mode, is completely reflected from any interface or reflecting surface if it strikes the reflecting surface at some angle greater than the critical angle of the delay medium. If the wave strikes at an angle less than the critical, it is at least in part converted to longitudinal or compressional waves, which are thereafter dispersed, eliminated or attenuated.

Figure 3:
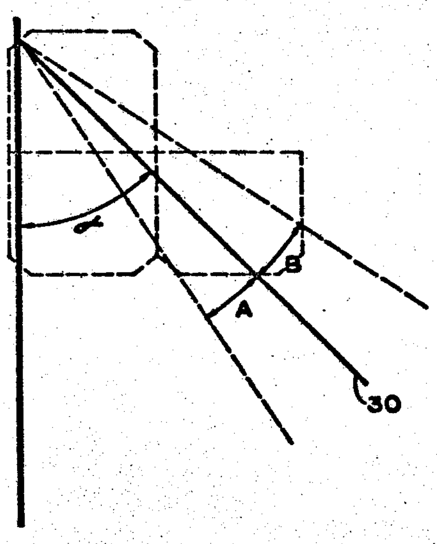
FIGURE 3 is a diagrammatic view of the "flopout" pattern of the path of elastic waves and the spurious signals associated therewith in a standard delay line.
Figure 4:
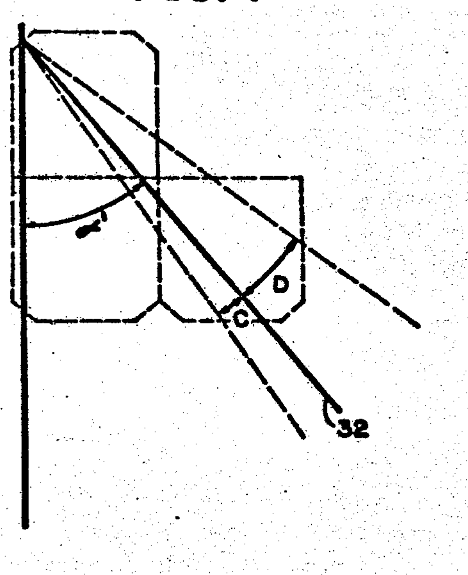
FIGURE 4 is a diagrammatic view of the "flopout" pattern of the path of elastic waves and the spurious signals associated therewith in a delay line formed in accordance with this invention.

The reflected signal path pattern can be illustrated by a "flopout" as shown in FIGURES 3 and 4. FIGURE 3 illustrates a "flopout" of a solid ultrasonic delay line having a regular rectangular form. The main signal is illustrated by line 30 having a strike angle denoted by $\alpha$. The area encompassed by angles A and B illustrates the spurious signals. In a regular rectangular solid delay line, angles A and B will be substantially equal to each other and to the difference between the critical angle of the delay medium and the signal strike angle. In such a delay line, strike angle $\alpha$ is generally 45 degrees.

Figure 2:
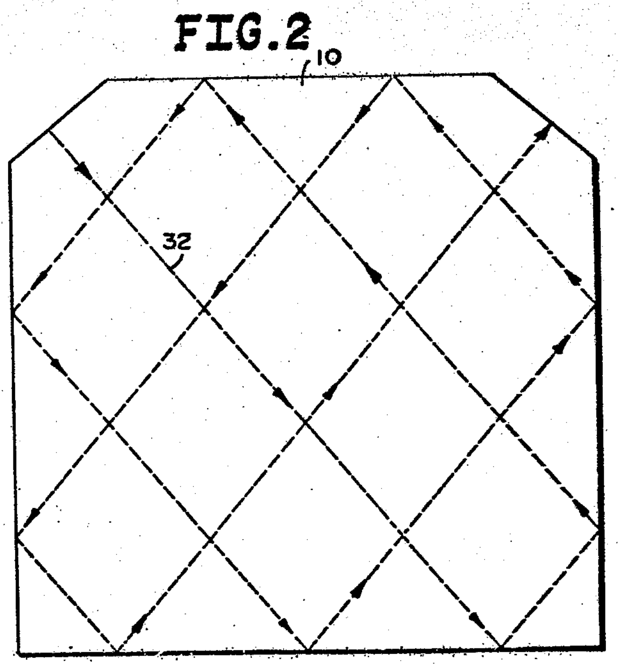
FIGURE 2 is a diagrammatic illustration of the path of a beam of elastic waves propagating through the solid ultrasonic delay line of FIGURE 1 in accordance with this invention.

Referring now to FIGURES 2 and 4, it has been discovered that by causing the main signal, illustrated by line 32, to have a strike angle $\alpha'$ ranging from the critical angle to about 2 degrees more than the critical angle of the delay medium, about one-half of the spurious signals closest to the main signal are caused to have a strike angle less than the critical angle of said delay medium. Such spurious signals are then converted from shear elastic waves to longitudinal and compressional waves eliminating or attenuating said spurious signals. The only spurious signals remaining on one side of the main signal are illustrated by the area of angle C. Since the spurious signals represented by the area of angle C are substantially zero, the only significant spurious signals remaining are those illustrated by the area of angle D which are substantially one-half of the spurious signals of heretofore known delay lines such as that illustrated in FIGURE 3.

Figure 5:
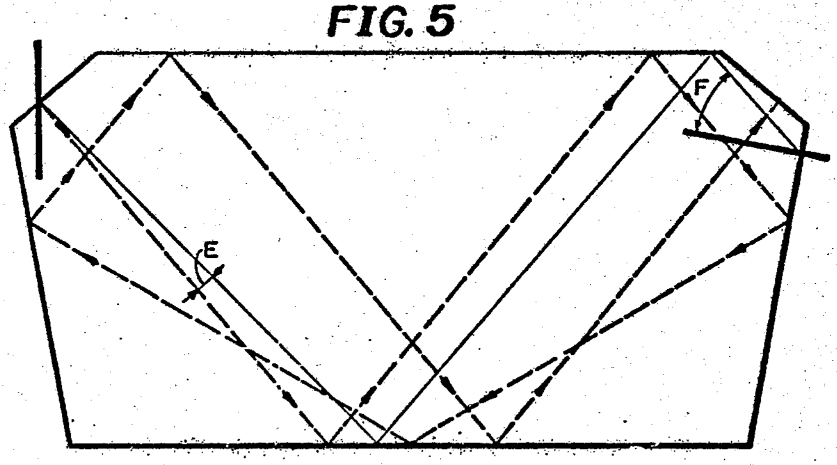
FIGURE 5 is a diagrammatic illustration of the path of a beam of elastic waves propagating through a solid ultrasonic delay line wherein the spurious signals on both sides of the main signal are attenuated by mode conversion.

Referring now to FIGURE 5, it is seen that by varying the peripheral geometry of the delay medium it is possible to cause spurious signals, illustrated by the area of angle E, which substantially correspond to those illustrated by the area of angle D in FIGURE 4, subsequently strike a reflecting facet at an angle such as F for example, which is less than the critical angle, thereby causing these remaining spurious signals to be converted from shear elastic waves to longitudinal or compressional waves and consequently be rejected or attenuated as heretofore described.

A typical example of carrying out this invention is illustrated in FIGURES 2 and 4 and the following description. A delay medium of an alkali-lead-silicate glass, such as described in the heretofore noted Hoover-Nordberg patent application, which glass has a critical angle of about 39 degrees, may be suitably formed into a rectangular plate-type configuration. Signal input and output facets are formed at adjacent corners of said plate and are so positioned that the signal strike angles at the reflection facets would be 39 degrees 30 minutes. The plate is then polished to substantially a commercial plate glass polish on the major plane surfaces, reflection facets, and input and output facets with cerium oxide having one-half to one micron size.

Input and output transducers of crystalline quartz, A.C. cut, are formed and mounted on said input and output facets for thickness-shear mode vibration parallel to the major planes of said delay medium.

Acoustic absorbers are formed of the heretofore noted indium rich alloy and are mounted on the reflection facets between the areas where the main signal will strike and be reflected, such as is illustrated in FIGURE 1. The various signals which are not converted to a different mode of vibration as heretofore described are absorbed by said acoustic absorbers.

In the delay line of this example, the spurious signals were 28 db below the main signal level, which is an improvement of approximately 19 db over heretofore known delay line configurations.

A solid ultrasonic delay line produced in accordance with this invention will have improved cancellation of selected individual spurious signals, improved main signal to noise level ratio, and an improved utility rate.

Although the present invention has been described with respect to specific details of certain embodiments thereof, it is not intended that such details be limitations upon the scope of the invention except insofar as set forth in the following claims.

What is claimed is:

1. An ultrasonic delay line comprising a solid delay medium in the form of a flat plate having input, output and reflection facets formed on the periphery thereof, the flat surfaces of said plate comprising the major planes of said delay medium, signal input and output transducers mounted on said input and output facets respectively for vibration in the thickness-shear mode parallel to said major planes, said input and output transducers being substantially insensitive to waves vibrating in the compressional mode, said reflection facets being formed and said input and output transducers being mounted to propagate the main signal so that its strike angle at the reflection facets is from about one-half to 2 degrees greater than the critical angle of said delay medium while about one-half of the spurious signals have a strike angle less than said critical angle at least one of the reflection facets and substantially the balance of the spurious signals have a strike angle less than the critical angle at at least one other of the reflection facets, and acoustic absorbers adhered to said reflection facets between points of reflection of said main signal.

2. The ultrasonic delay line of claim 1 wherein said delay medium is formed of material selected from the group consisting of fused silica and alkali-lead-silicate glass.

3. The ultrasonic delay line of claim 1 wherein said input and output transducers are formed of material selected from the group consisting of crystalline quartz, barium titanate, potassium sodium niobate, and mixtures of lead zirconate and lead titanate.

4. An ultrasonic delay line comprising a solid delay medium of alkali-lead-silicate glass in the form of a flat plate having input, output, and reflection facets formed on the periphery thereof, the flat surfaces of said plate comprising the major planes of said delay medium, signal input and output quartz transducers mounted on said input and output facets respectively for vibration in the thickness-shear mode parallel to said major planes, said input and output transducers being substantially insensitive to waves vibrating in the compressional mode and being mounted to propagate the main signal wave so that its strike angle at the reflection facets is about 39 degrees 30 minutes, and acoustic absorbers adhered to said reflection facet between points of reflection of said main signal.

References Cited by the Examiner

UNITED STATES PATENTS

| | | | |
|---|---|---|---|
| 2,624,804 | 1/1953 | Arenberg | 333—30 |
| 2,839,731 | 6/1958 | McSkimin | 333—30 |
| 2,859,415 | 11/1958 | Fagen | 333—30 |
| 2,867,777 | 1/1959 | Robinson | 333—30 |
| 2,907,958 | 10/1959 | Skaggs | 333—30 |
| 2,957,142 | 10/1960 | May | 333—30 |
| 3,174,120 | 3/1965 | Brounens | 333—30 |

HERMAN KARL SAALBACH, *Primary Examiner.*

C. BARAFF, *Assistant Examiner.*